United States Patent [19]

Nikitin et al.

[11] 4,413,201
[45] Nov. 1, 1983

[54] DEVICE FOR ATTACHMENT OF COIL ENDS IN GENERATOR STATOR HIGH-VOLTAGE WINDING

[76] Inventors: Pavel Z. Nikitin, ulitsa Stroitelei, 5 korpus 1, kv. 2, Moscow; Yanush B. Danilevich, ulitsa Tipanova, 29, kv. 681, Leningrad; Konstantin N. Maslennikov, ulitsa Petukhova, 138, kv. 87; Konstantin F. Potekhin, ulitsa Stanislavskogo, 11, kv. 186, both of Novosibirsk; Lev A. Zolotov, bulvar Yana Rainisa, 9, kv. 55, Moscow; Veniamin S. Turutin, ulitsa Perovskaya, 8, korpus 1, kv. 26, Moscow; Tibor M. Nemeni, ulitsa Khalturinskaya, 11, kv. 245, Moscow; Alexandr I. Nikolsky, ulitsa Dubninskaya, 14, korpus 2, kv. 59, Moscow; Pavel S. Kabanov, ulitsa Sevanskaya, 19, korpus 1, kv. 22, Moscow; Gennady A. Bezchastnov, Polessky proezd, 4, korpus 2, kv. 33, Moscow; Andrei M. Sharashkin, ulitsa S. Eizenshteina, 6, kv. 164, Moscow, all of U.S.S.R.

[21] Appl. No.: 269,043

[22] PCT Filed: Sep. 25, 1980

[86] PCT No.: PCT/SU80/00161

§ 371 Date: Jun. 25, 1981

§ 102(e) Date: May 11, 1981

[87] PCT Pub. No.: WO81/01223

PCT Pub. Date: Apr. 30, 1981

[30] Foreign Application Priority Data

Oct. 25, 1979 [SU] U.S.S.R. .............................. 2824887

[51] Int. Cl.³ ............................................. H02K 3/46

[52] U.S. Cl. ..................................... 310/260; 310/58; 310/214

[58] Field of Search .................. 310/260, 270, 54, 58, 310/59, 64, 65, 89, 194, 214; 336/197

[56] References Cited

U.S. PATENT DOCUMENTS 3,348,085 10/1967 Coggeshall ......................... 310/260
3,975,655 8/1976 Beermann .......................... 310/260
4,274,021 6/1981 Kamiya .............................. 310/260

FOREIGN PATENT DOCUMENTS 1366320 6/1964 France ................................ 310/260
2,298,895 1/1976 France ................................ 310/260
215305 11/1963 U.S.S.R. ............................. 310/260

OTHER PUBLICATIONS

Titov et al.; "Turbo-Generators, Design & Construction" Energia Publ's; 1967; Leningrad; U.S.S.R.; pp. 38-45, 70-72.

Primary Examiner—R. Skudy
Attorney, Agent, or Firm—Myron Greenspan; Burton L. Lilling; Bruce E. Lilling

[57] ABSTRACT

A device for attachment of coil ends in a generator stator high-voltage winding includes insulation spacers (13) disposed on external surfaces of the coil end bars (16), auxiliary spacers disposed between coil end bars (16), a case (1), spring stops (15) anchored inside the case (1), and planks (14). The case (1) is made of two coaxial truncated-cone members (2 and 3) and a part of a torus member (4) made integral therewith and incorporating a joint (5) with a seal (6). Each plank (14) is arranged between two insulation spacers (13), and the insulation spacers (13) are arranged between the coil end bars (16) and the spring stops (15). The insulation spacers (13), the planks (14), the spring (15) and a side surface of the case (1) form cooling passages.

1 Claim, 2 Drawing Figures

DEVICE FOR ATTACHMENT OF COIL ENDS IN GENERATOR STATOR HIGH-VOLTAGE WINDING

TECHNICAL FIELD

The present invention relates in general to electric machine building, and is particularly concerned with devices for attachment of coil ends in generator stator high-voltage windings.

BACKGROUND ART

The present-day technology of generator construction is characterized by trends toward building-up the unit power of generators, with the result that in the present state of the art, the generator stator windings must be designed to handle high rated currents (from 10 to 60 kA). Hence, at the existing levels of generator voltages (from 15 to 27 kV), the dimensions of stator winding bars must be increased substantially, and the length of stator winding coil end bars must be extended accordingly. Furthermore, manufacture of modern high-power generators is practical due to the realization of direct liquid cooling of the generator winding, with the dimensions of the generator stator winding bars increased still further to furnish passages for supply of coolant. In its turn, the length of the stator winding coil end bars has extended even more, with direct cooling of the stator winding bars provided by means of intricate devices for supply of coolant which in most cases do not permit raising the generator voltage substantially above the established level /cf. V. V. Titov, G. M. Khutoretzkiy, G. A. Zagorodnaya, G. P. Vartanian, D. I. Zaslavskiy and A. I. Smotrov, "Turbo-Generators. Design and Construction", Energia Publishers, 1967, Leningrad, pp. 38 through 45 and 70 through 72 (in Russian)/.

Known in the art is a device for attachment of generator winding coil end bars, wherein the coil ends are held by shrink rings embracing the bars on the outside by a set of spacers disposed in gaps between individual bars. Each bar in a bottom and a top layer is fastened to each shrink ring. The shrink rings are attached to the generator stator by means of brackets. The spacers are fastened to the bars, and the coolant is supplied to the stator winding bars through rubber hoses (cf. V. V. Titov, G. M. Khutoretzkiy, G. A. Zagorodnaya, G. P. Vartanian, D. I. Zaslavskiy and A. I. Smotrov, "Turbo-Generators. Design and Construction", Energia Publishers, 1967, Leningrad, pp. 188 through 192).

In the prior-art device, the winding coil end bars are attached to the generator stator on one side only, and this is obviously insufficient for longer bars of the winding coil ends used in higher unit power generators designed for output voltages above the existing level, so that the generator dependability is impaired.

The above method of attachment of the shrink rings and spacers in the prior-art generator is not quite reliable.

The closest analog to our invention is a device for attachment of coil ends in a generator stator high-voltage winding (cf. USSR Inventor's Certificate No. 215305 H02K 3/50, published in the Bulletin of Discoveries, Inventions, Designs and Trade Marks, No. 13, Nov. 3, 1963). The foregoing device incorporates a shrink ring mounting supporting brackets attached thereto, insulation spacers furnished with spacer wedges disposed therebetween and positioned on external surfaces of the coil end bars, and extra spacers furnished with the spacer wedges disposed therebetween and positioned between the coil end bars. The insulation spacers are clamped at the ends thereof by insulation rings. A hollow shrink ring through which coolant is supplied serves as a coolant header.

The prior-art method of attachment of the generator stator high-voltage winding coil ends permits securing the coil end bars only on one side facing the generator end plate, and is therefore insufficiently reliable, the coil end bars in modern high-power generators being quite long (about 1/5 of the active length thereof per each side).

Owing to the use of supporting brackets and shrink rings for attachment of the stator high-voltage winding coil ends, a long range of insulation and constructional materials are required.

DISCLOSURE OF THE INVENTION

The present invention is to provide a device for attachment of the generator stator high-voltage winding coil ends, the construction of which will permit improving the operating dependability of the generator and saving insulation and coinstructional materials.

This is attained in a device for attachment of generator stator high-voltage winding coil ends herein proposed, comprising insulation spacers disposed on external surfaces of the coil end bars, extra spacers disposed between the coil end bars, and a case made, according to the invention, of two coaxial truncated cone members and a part of a torus member made integral therewith and provided with a joint with a sealing, said case accommodating the insulation spacers, the extra spacers, spring stops attached inside the case to the side surface thereof and located opposite each insulation spacer, and platens, with each platen disposed between two insulation spacers and attached to one of them, and with the insulation spacers disposed between the winding coil end bars and spring stops, each surface part of the insulation spacers, platens and spring stops and an inner side surface of the case being used for making cooling passages.

An important advantage of the present invention is that electric energy can be saved by virtue of extending periods between overhauls due to higher dependability of attachment of the stator high-voltage winding coil ends and due to improved cooling of the winding in the area of the coil ends thereof. In addition, the foregoing shape of the coolant-containing case according to the invention contributes to minimizing the dimensions of the generator end area and, hence, to reducing the requirements of structural steel used in manufacture of the coolant-containing case. The foregoing shape of the case is optimum from the point of view of the response thereof to the internal coolant pressure, with the result that the period between overhauls can be prolonged.

BRIEF DESCRIPTION OF DRAWINGS

The invention will now be described in greater detail with reference to a preferred embodiment thereof taken in conjunction with the accompanying drawings, wherein.

BEST MODE FOR CARRYING OUT THE INVENTION

Figure 1:
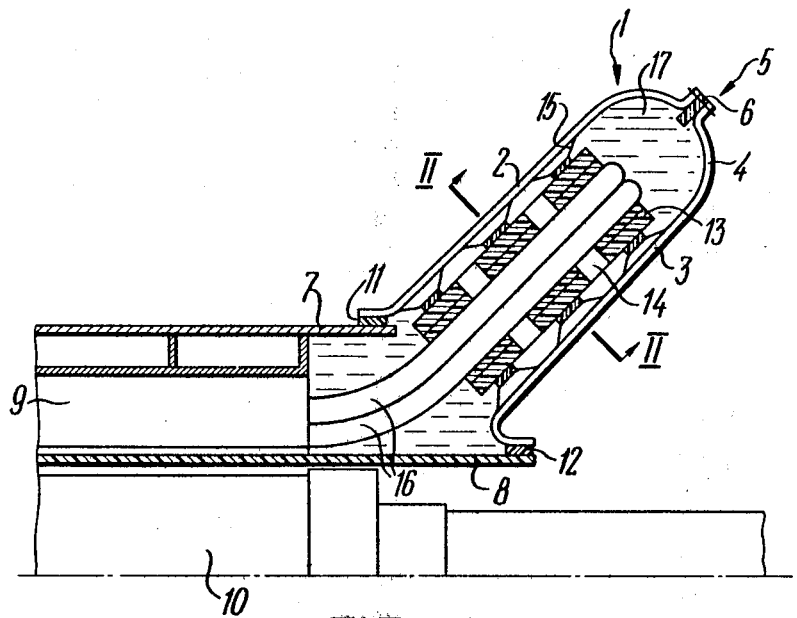
FIG. 1 is a longitudinal sectional view of a device for attachment of generator stator high-voltage winding coil ends according to the invention.

Referring to FIG. 1, the device for attachment of the generator stator high-voltage winding coil ends comprises a coolant-containing case 1 formed by two coaxial truncated-cone members 2 and 3 coupled to each other by a part of a torus member 4 made integral therewith and furnished with a joint 5 incorporating a sealing 6.

The truncated-cone member 2 rests on a generator case tube 7, and the truncated-cone member 3 rests on a separating cylinder 8 disposed between a stator 9 and a rotor 10. In areas of attachment of the truncated-cone members 2 and 3 to the generator case tube 7 and to the separating cylinder 8, respective sealings 11 and 12 are installed. Insulation spacers 13 located on external surfaces of the coil ends and made of such materials as bakelite, and platens 14 attached thereto are secured to spring stops 15.

The spring stops 15 are attached in their turn to internal surfaces of the truncated-cone members 2 and 3 of the case 1, and are arranged opposite each insulation spacer 13. Each platen 14 is disposed between the two insulation spacers 13. The insulation spacers 13 are disposed between bars 16 of the high-voltage winding coil ends and the spring stops 15.

Figure 2:
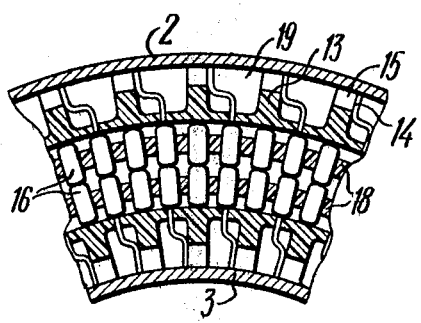
FIG. 2 is a sectional view of same taken along line II—II of FIG. 1 according to the invention.

The truncated-cone members 2 and 3, the part of the torus member 4, the separating cylinder 8 and the generator case tube 7 constitute a sealed space into which a compressed coolant 17 is supplied. The bars 16 of the stator high-voltage winding coil ends 9 are also held by extra spacers 18 (FIG. 2) which serve to reinforce the generator stator high-voltage winding coil ends in a tangential direction.

When the truncated-cone members 2 and 3 are installed, the bars 16 of the generator stator high-voltage winding coil ends are fixed on the diameter thereof, on top and bottom by means of the insulation spacers 13 and spring stops 15. The platens 14 serve for overlapping the gaps between the insulation spacers 13 and for forming cooling passages 19.

The cooling passages 19 are formed by a part of surface of the insulation spacers 13, spring stops 15 and platens 14, and by the internal side surface of the case 1.

The coolant 17 (FIG. 1) is supplied under pressure from the sources of cooling liquid through the cooling passages 19 (FIG. 2) in an axial direction, and cools the high-voltage winding coil end bars both inside and outside.

The coolant 17 flows through slots in the generator stator 9 to a low-pressure case identical to the case 1 and disposed in the opposite end of the generator.

Thus, the coolant 17 cools down the generator winding coil ends as well as active sections of the winding both inside and outside. The coolant-containing case 1 shaped in accordance with the present invention, and the insulation spacers 13, spring stops 15 and platens 14 distributed circumferentially on an end surface of the generator constitute a set of the cooling passages 19 (FIG. 2) optimum from the point of view of cooling the end area of the generator at minimum turbulence of flowing coolant at an inlet of the stator 9, the passages being distributed evenly on the circumference of the coil ends. As a result, the cooling efficiency rises, and the intensity of heating of the generator end area decreases, particularly in the high-voltage generators incorporating the winding coil end bars 16 of great length. Hence, the operating dependability of the generator is improved and the time between overhauls is prolonged.

The winding coil ends in the stator 9 can be securely attached both inside and outside owing to the use and appropriate arrangement of the spring stops 15, insulation spacers 13 and platens 14, and due to the proposed shape of the case 1 containing the coolant 19 and comprising the truncated-cone members 2 and 3 coupled to each other by the part of the torus member 4 incorporating the joint 5, with the case 1 shaped identically to the coil ends. In the event of the high-voltage generators equipped with long coil end bars 16, the foregoing feature also contributes substantially to the generator operating dependability. In addition, the proposed shape of the case 1 containing the coolant 17 (FIG. 1) permits removing the stress concentrating in the areas of abruptly-curving surfaces, and is optimum from the point of view of response of the case to an internal pressure exerted by the coolant 17 on the walls thereof, with the result that the time between overhauls is prolonged and constructional metal requirements of the device are minimized.

The constructional and insulation material requirements are also reduced because the device for attachment of the generator stator high-voltage winding coil ends according to the invention does not include shrink rings, insulation rings and rubber hoses serving for supply of the coolant to the stator winding bars.

Assembly of fastening parts in the device for attachment of the generator stator high-voltage winding coil ends is greatly simplified along with the procedure of attachment of the coil ends by means of said parts.

During assembly, the truncated-cone member 3 of the case 1 containing the coolant 17 is installed in the first place, with the insulation spacers, spring stops 15 and platens 14 already mounted thereupon.

Since all the fastening parts of the device for attachment of the generator stator high-voltage coil ends are fastened beforehand to the side walls of the truncated-cone members 2 and 3 and to the winding coil end bars 16 of the generator stator 9, all the assembly procedure is essentially limited to applying and interconnecting the truncated-cone members 2 and 3, whereby the assembly time required for installation of the device for attachment of the generator stator high-voltage winding coil ends is cut down considerably, and the assembly time of the generator as a whole is notably reduced.

Thus, the present invention provides for saving electric energy by virtue of extending periods between overhauls through improvement in dependability of attachment of the high-voltage winding coil ends and in cooling same. The foregoing shape of the case contributes to a reduction of dimensions of the generator end area and to minimizing of consumption of structural steel in manufacture of the cooling case.

INDUSTRIAL APPLICABILITY

The invention can most advantageously be used in manufacture of high-power generators, such as turbogenerators operated at thermal and atomic electric power plants.

We claim:

1. A device for attachment of generator stator high-voltage winding coil ends, comprising insulation spacers disposed on external surfaces of the coil end bars, extra spacers disposed between the coil end bars, characterized in that it also comprises a case (1) made of two coaxial truncated cone members (2 and 3) and a part of a torus member (4) made integral therewith and provided with a joint (5) with a sealing (6), said case (1) accommodating insulation spacers (13), extra spacers (18), spring stops (15) secured inside the case (1) to the side surface thereof and located opposite each insulation spacer (13), and platens (14), each said platen (14) being disposed between two insulation spacers (13) and attached to one of them, the insulation spacers (13) being disposed between the winding coil end bars (16) and spring stops (15), each surface part of the insulation spacers (13), platens (14) and spring stops (15) and an inner side surface of the case (1) being used as cooling passages.

* * * * *